United States Patent [19]

Nishikawa

[11] Patent Number: 6,148,108
[45] Date of Patent: Nov. 14, 2000

[54] SYSTEM FOR ESTIMATING MOTION VECTOR WITH INSTANT ESTIMATION OF MOTION VECTOR

[75] Inventor: Tsuyoshi Nishikawa, Kawasaki, Japan

[73] Assignee: Kabushiki Kaisha Toshiba, Kanagawa-ken, Japan

[21] Appl. No.: 09/007,603

[22] Filed: Jan. 15, 1998

[30] Foreign Application Priority Data

Jan. 16, 1997 [JP] Japan ................................ 9-005595

[51] Int. Cl.[7] .............................. G06K 9/46; H04N 5/16; H04N 7/12
[52] U.S. Cl. .......................... 382/236; 382/232; 382/253; 348/416; 348/699
[58] Field of Search .................................... 382/236, 253, 382/238, 232; 348/416, 699, 402, 413

[56] References Cited

U.S. PATENT DOCUMENTS

| | | | |
|---|---|---|---|
| 5,473,379 | 12/1995 | Horne ...................................... | 348/416 |
| 5,557,341 | 9/1996 | Weiss et al. ............................. | 348/699 |
| 5,657,087 | 8/1997 | Jeong et al. ............................ | 348/699 |
| 5,715,016 | 2/1998 | Kobayashi et al. ..................... | 348/699 |
| 5,731,850 | 3/1998 | Maturi et al. ........................... | 348/699 |
| 5,739,872 | 4/1998 | Kim et al. ............................... | 348/699 |
| 5,742,710 | 4/1998 | Hsu et al. ............................... | 382/236 |
| 5,751,362 | 5/1998 | Lee ......................................... | 348/699 |
| 5,825,423 | 10/1998 | Jung ....................................... | 348/699 |
| 5,838,828 | 11/1998 | Mizuki et al. .......................... | 382/236 |

*Primary Examiner*—Phuoc Tran
*Assistant Examiner*—Daniel G. Mariam
*Attorney, Agent, or Firm*—Hogan & Hartson, LLP

[57] ABSTRACT

A motion vector estimating system comprises a current image storing unit 1, a reference image storing unit 2, a motion vector estimating circuit 3 for estimating a motion of a current image in relation to a reference image, and a global motion vector estimating circuit 10. The global motion vector estimating circuit 10 comprises at least a feature setting part 11 for setting and recording a feature being a partial region distinguishable from other regions of a principle object in a picture, a feature-coordinates extracting part 12 for searching the current image for the feature to extract the coordinates of the feature, and a feature-coordinates storing part 13 for storing the coordinates of the feature. When the feature-coordinates extracting part 12 extracts the coordinates of the feature from the current image, the motion vector estimating system derives a difference between the feature coordinates stored in the storing part 13 and the extracted feature coordinates on the basis of a feature presence information outputted from the feature-coordinates extracting part 12, in order to estimate a global motion vector. When the feature-coordinates extracting part 12 has not could extract the feature, the motion vector estimating system carries out the usual motion vector estimation. Thus, in addition to the usual motion vector estimation, the presence and coordinates of a feature are extracted from the whole screen of a picture to detect a motion vector to retrieve a correct motion vector at the initial stage of the retrieval, so that it is possible to save the electric power and decrease the estimation time.

8 Claims, 8 Drawing Sheets

SYSTEM FOR ESTIMATING MOTION VECTOR WITH INSTANT ESTIMATION OF MOTION VECTOR

BACKGROUND OF THE INVENTION

The present invention relates generally to the field of moving picture compression technique. More specifically, the invention relates to a motion vector estimating system, which carries out, at low costs, the operation for a motion vector estimation used for a moving picture compression.

In general, moving picture estimation is essential to moving picture compression technique used for video telephones and so forth. In this process, the costs in operation and electric power consumption are greatly increased as the search range is increased so as to correspond to generalized patterns. In the uses for mobile video telephones and so forth, there has been provided technique for cutting an image information on a particular object such as a face of a person, out of the whole picture to transmit the cut image information in order to reduce the amount of information. However, in the present circumstances, it is technically difficult to cut a specific object out of a picture with a natural picture for a background, unlike a picture taken in a studio.

In the moving picture compression or the like, motion vectors are extracted by a process, which comprises the steps of: dividing the screen of an inputted current image into partial regions (each of which will be hereinafter referred to as a "macro block"); shifting the coordinates of the macro blocks by (+x, +y); accumulating the luminance signal differences (which will be hereinafter referred to as "SAD") from the screen of a reference image at that time for each of the picture elements (pixels) in the macro block; and adopting, as a motion vector, (x, y) when the accumulated value is minimum. In this operation, the load increases in proportion to the square of the region of search for the motion vectors. Therefore, when motion vectors are extracted for each of the macro blocks which are presented in the whole screen, it is difficult to increase the region of search for motion vectors.

On the other hand, unlike general motion vector estimations, in the case of a specific image pattern represented by a simple picture feature, for example, in the case of double circles of violet and yellow, it is easy to search the whole screen to determine the presence of the feature on the screen or to identify the global coordinates of the feature. The vector prepared by tracing the global positions of the characteristic pictures in sequential pictures will be hereinafter referred to as a "global motion vector" for convenience.

SUMMARY OF THE INVENTION

It is therefore an object of the present invention to eliminate the aforementioned problems and to provide a motion vector estimating system, which can not only carry out a usual motion vector estimation, but also estimate a proposed motion vector close to a correct motion vector at the initial stage of the vector search by identifying the presence and coordinates of a feature on the whole screen of a picture, to save the electric power and the estimation time.

In order to accomplish the aforementioned and other objects, according to the present invention, a motion vector estimating system may comprise current image storing means, reference image storing means, a motion vector estimating circuit for estimating a motion of a current image in relation to a reference image, and a global motion vector estimating circuit. The global motion vector estimating circuit may comprise at least feature setting means for setting and recording a feature being a partial region distinguishable from other regions of a principle object in a picture, feature-coordinates extracting means for searching the current image for the feature to extract the coordinates of the feature, and feature-coordinates storing means for storing the coordinates of the feature. When the feature-coordinates extracting means extracts the coordinates of the feature from the current image, the motion vector estimating system may derive a difference between the feature coordinates stored in the storing means and the extracted feature coordinates on the basis of a feature presence information outputted from the feature-coordinates extracting means, in order to estimate a global motion vector. When the feature-coordinates extracting means cannot extract the feature, the motion vector estimating system may carry out the usual motion vector estimation.

That is, according to one aspect of the present invention, there is provided a motion vector estimating system, which comprises: current image storing means for storing a current image being an inputted moving picture information; reference image storing means for storing a reference image information; a motion vector estimating circuit for estimating a motion in the current image stored in the current image storing means, in relation to the reference image stored in the reference image storing means; and a global motion vector estimating circuit including: feature setting means for setting a feature being a partial region distinguishable from other regions of a principle object in a picture, feature-coordinates extracting means for searching the current image stored in the current image storing means, for the feature stored in the feature setting means, to identify the position of the feature on a coordinate as feature coordinates, and feature-coordinates storing means for storing the feature coordinates extracted by the feature-coordinates extracting means, wherein the motion vector estimating circuit derives a difference between the feature coordinates stored in the feature-coordinates storing means and the feature coordinates extracted by the feature-coordinates extracting means on the basis of a feature presence information outputted from the feature-coordinates extracting means, to estimate a global motion vector, when the feature-coordinates extracting means extracts the coordinates of the feature, which has been set by the feature setting means, from the current image.

The global motion vector estimating circuit may comprise: a feature describing circuit, serving as the feature setting means, for describing the feature; a feature-coordinates extracting circuit for extracting the feature from a screen of the current image supplied from a current image frame memory serving as the current image storing means, to output the presence and coordinates of the feature in the screen; a feature-coordinates information buffer for temporarily storing the feature coordinates outputted from the feature-coordinates extracting circuit; and a last picture feature-coordinates information buffer for storing the feature of the last current image, which has been stored, when the feature coordinates of the present current image is outputted to the feature-coordinates storing buffer.

The feature describing circuit for describing a predetermined shape of marker serving as the feature on the picture of the principal object at an optional position may be provided in the global motion vector estimating circuit, and the motion vector estimating system may include: a current image pixel-position correction circuit for correcting the coordinates of a picture element when reading the current image information out of the current image frame memory on the basis of correction information on a feature-position fixing outputted from the global motion vector estimating circuit in a case where a feature-position fixing request signal supplied from the outside is active, to output a feature presence information representative of the presence of the feature in the current image; and a marker erasing circuit for erasing the marker described by the feature describing circuit from the picture on the basis of the coordinates information outputted from the global motion vector estimating circuit and the feature presence information outputted from the current image pixel-position correction circuit.

The motion vector estimating circuit may be provided in a moving picture processing unit, which carries out the image processing of the current image supplied from the current image frame memory using a motion vector information of each macro block serving as a unit obtained by dividing the current image into partial regions, the feature presence information and the feature coordinates information, and which carries out the image processing in the case of no motion vector when a motion vector estimation stopping signal for stopping the estimation of a motion vector for each of macro blocks is active.

The moving picture processing unit may be provided in a MPEG2 encoder for processing a moving picture in accordance with the standard of MPEG2, which is a standard defined by a moving picture expert group.

The motion vector estimating system may include a feature describing circuit for describing a marker being a specific picture serving as a feature set on the principal object at an optional position, and feature-coordinates extracting means having storing means for storing the feature of the specific picture, and the motion vector estimating system may extract the feature of the principal object from the whole region of a picture frame or field to extract global coordinates of the feature of the principal object to measure the movement of the characteristic point of the principal object between frames or fields to derive the global motion vector of the principal object.

The motion vector estimating system may include stopping means for stopping the estimating operation of a motion vector with respect to a macro block serving as each of partial regions of a divided screen when the magnitude of the global motion vector of the principal object is unsuitable for a moving picture compression standard.

In the motion vector estimating system, a motion vector close to the global motion vector may be preferentially calculated in the macro block serving as each of partial regions of the divided screen.

As described above, according to the present invention, the motion vector estimating system comprises current image storing means, reference image storing means, a motion vector estimating circuit for estimating a motion of a current image in relation to a reference image, and a global motion vector estimating circuit, which comprises at least feature setting means for setting and recording a feature being a partial region distinguishable from other regions of a principle object in a picture, feature-coordinates extracting means for searching the current image for the feature to extract the coordinates of the feature, and feature-coordinates storing means for storing the coordinates of the feature, wherein when the feature-coordinates extracting means extracts the coordinates of the feature from the current image, the motion vector estimating system derives a difference between the feature coordinates stored in the storing means and the extracted feature coordinates on the basis of a feature presence information outputted from the feature-coordinates extracting means, to estimate a global motion vector, and when the feature-coordinates extracting means cannot extract the feature, the motion vector estimating system carries out the usual motion vector estimation. Thus, in addition to the usual motion vector estimation, the presence and coordinates of a feature are extracted from the whole screen of a picture to detect a motion vector to retrieve a correct motion vector at the initial stage of the retrieval, so that it is possible to save the electric power and decrease the estimation time.

Therefore, if an image pattern that can be readily described and found is used as a marker, a circuit for detecting the coordinates of a characteristic point can be easily formed and accelerated. This system is economical since it uses a ROM. If a plurality of marker patterns are prepared in the ROM and a marker that can be readily found is remounted in a principal object, it is possible to quickly respond to the variations in background color and quantity of light due to the variation in environment when the real-time moving picture compression is carried out.

In addition, when the global motion vector of the principal object is unsuitable for the moving picture compression standard, the motion vector estimation is stopped by regarding the compression as difficult, so that it is possible to save the working power and the processing time. If a suitable motion vector is found at the initial stage in the process for accumulating the absolute values of the pixel luminance difference, it is possible to stop the accumulation calculation of unsuitable motion vectors a little early, so that it is possible to save the working power and time required for the motion vector estimation.

Moreover, it is not only possible to electronically correct the blurring without the need of a mechanical arrangement, but it is also possible to cut out a principal object without the need of a special facility such as means for making the background blue. Since an artificial object having a specific pattern is used, it is easy to carry out a mechanical estimation, so that it is easy to form the estimation system. In addition, since a seal or the like is put on, it is easy to use the system, and it is possible to reduce a feeling of operational wrongness when a marker is put on a face or the like.

DESCRIPTION OF THE PREFERRED EMBODIMENTS

Referring now to the accompanying drawings, the preferred embodiments of a motion vector estimating system, according to the present invention, will be described in detail below.

Figure 1:
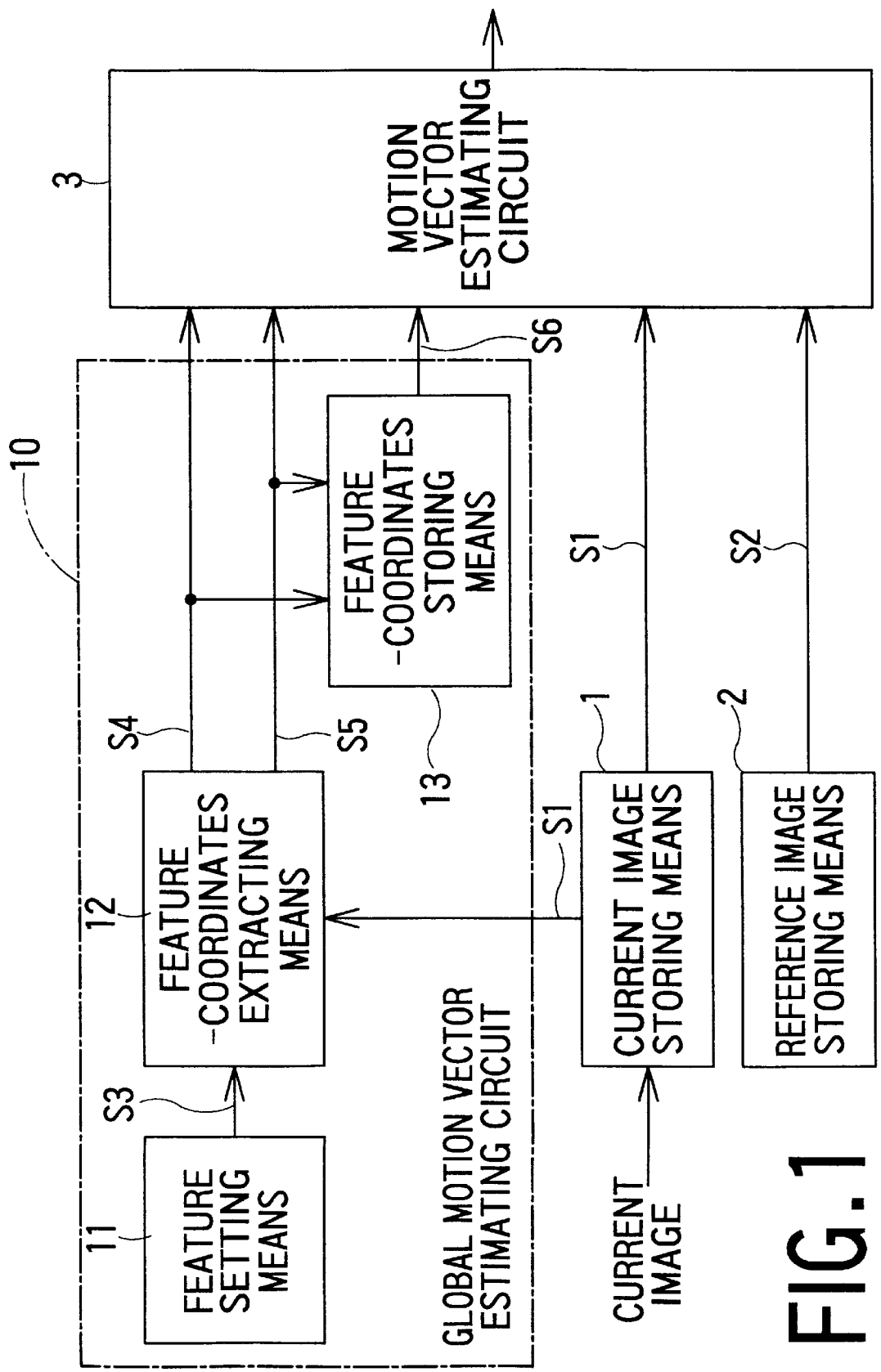
FIG. 1 is a block diagram of the first preferred embodiment of a motion vector estimating system according to the present invention.

FIG. 1 is a block diagram of the first preferred embodiment of a motion vector estimating system, according to the present invention, which includes a basic concept of the present invention.

In FIG. 1, the first preferred embodiment of the motion vector estimating system comprises: current image storing means 1 for storing a current image being an inputted moving picture information; reference image storing means 2 for storing a reference image information; and a motion vector estimating circuit 3 for estimating the motion in the current image stored in the current image storing means 1 in relation to the reference image stored in the reference image storing means 2. This motion vector estimating circuit 3 has a global motion vector estimating circuit 10, which comprises: at least feature setting means 11 for setting and recording a feature being a partial region, which can be distinguished from other portions in a principal object within a picture; feature-coordinates extracting means 12 for seeking the feature, which has been set in the feature setting means 11, from the current image stored in the current image storing means 1, to identify the position of the feature on coordinates as feature coordinates; and feature-coordinates storing means 13 for storing the feature coordinates extracted from the feature-coordinates extracting means 12. When the feature-coordinates extracting means 12 extracts the feature, which has been set by the feature setting means 11, from the current image on the basis of the coordinate, the motion vector estimating circuit 3 derives the difference between the feature coordinates stored in the feature-coordinates storing means 13 and the feature coordinates extracted by the feature-coordinates extracting means 12 on the basis of the feature presence information outputted from the feature-coordinates extracting means 12, to detect a global motion vector When the feature-coordinates extracting means 12 cannot extract the feature from the current image, the motion vector estimating circuit 3 carries out the usual detection of motion vectors.

In a case where the first preferred embodiment of the motion vector estimating system having the global motion vector estimating circuit detects a global motion vector, it is possible to decrease the motion vector estimating costs and/or to prevent the deterioration of the picture quality, by the following methods.

(1) When the magnitude of the global motion vector exceeds a standard range of a moving picture compression system, the extraction of motion vectors for each of macro blocks is stopped to select a non-motion compensated image, or the compressibility is decreased to maintain the picture quality.

(2) When the magnitude of the global motion vector is within the standard range of the moving picture compression system, the global motion vector and a motion vector close to the global motion vector are retried at the initial stage of the motion vector retrieval for each of macro blocks, to increase the probability of finding a correct motion vector at the initial stage to decrease the costs in electric power and time.

In addition, the first preferred embodiment of the motion vector estimating system can carry out the following processing by means of the global motion vector, and has an enhanced industrial utilizability to be effective. In particular, in a case where an image outputted from a non-fixed terminal, such as a mobile terminal, is processed, if the coordinates of each of picture elements of an inputted image are corrected by means of the global motion vector, the whole screen can follow the principal object, and the blurring of the picture and the unnecessary turbulence of the picture can be corrected by digital processing.

Since the motion vector of the principal object is apparently indicated, it is easy to cut out the principal object by grouping the motion vectors of the respective macro blocks and the SAD accumulated results. In addition, the global motion vector estimating system retains information representative of the characteristic point of the principal object in a RAM or ROM. In the case of the RAM, the data of the characteristic point can be incorporated by designating a part of image information. Contrarily, in the case of the ROM, the global motion vector can be extracted by setting a marker, which is representative of the feature written in the ROM, on the principal object. If a marker easy to describe the characteristic point is used, it is possible to easily form a circuit necessary for the detection of the global motion vector. In a case where the image processing of a face of a person or the like is carried out using a ROM and a characteristic-point designating marker, a feeling of wrongness is given by the presence of the marker. Therefore, the site recognized as the marker is replaced by a pattern of pixels around the marker through a marker erasing circuit when a frame memory is referred, so that it is possible to remove the feeling of wrongness so as to be apparently no marker.

It is possible to register an optional image pattern as a characteristic point to carry out a global characteristic-point coordinates detection. Using technique for suitably replacing characteristic-point information, it is possible to quickly respond to the variations in background color and quantity of light due to the variation in environment when the real-time moving picture compression is carried out.

Figure 2:
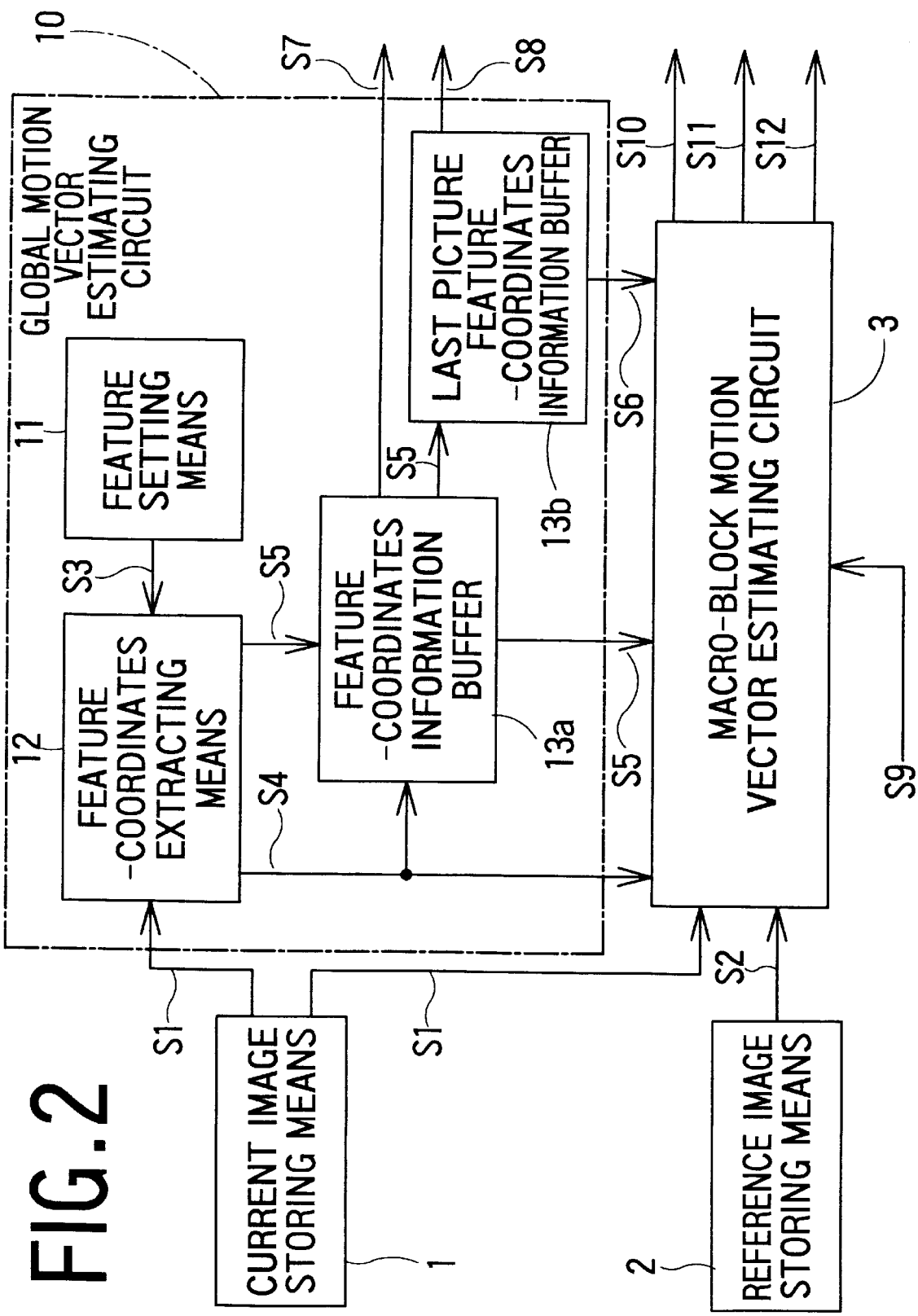
FIG. 2 is a block diagram of the second preferred embodiment of a motion vector estimating system according to the present invention.

Referring to FIG. 2, the second preferred embodiment of a motion vector estimating system, according to the present invention, will be described below.

FIG. 2 is a block diagram of the second preferred embodiment of a motion vector estimating system according to the present invention. In this figure, the motion vector estimating system comprises a current image frame memory 1, a reference image frame memory 2, a macro-block unit motion vector estimating circuit 3, and a global motion vector estimating circuit 10. The global motion vector estimating circuit 10 comprises: a feature describing circuit 11 serving as a feature setting means for describing a feature, e.g., a mark, in a principal object on a screen of the current image; a feature-coordinates extracting circuit 12 for referring to the current image frame memory 1 to search the whole screen for a small-region picture indicated by the feature describing circuit 11; a feature-coordinates information buffer 13a for storing the present feature coordinates extracted by the feature-coordinates extracting circuit 12; and a last picture feature-coordinates information buffer 13b for storing the last feature picture.

With this construction, the operation of the motion vector estimating system will be described. The feature-coordinates extracting circuit 12 refers to the current image frame memory 1 to search the whole screen for a small-region picture having the feature indicated by the feature describing circuit 11. When the small region corresponding to the feature is found, this is used as a feature screen to output the present feature presence information S4 to the macro-block motion vector estimating circuit 3, and the information S4 and a feature-coordinates information S5 to the feature-coordinates information buffer 13a. The feature-coordinates information buffer 13a temporarily stores and outputs the information S5 to the macro-block unit motion vector estimating circuit 3, and outputs the present feature-coordinates information to the last picture feature-coordinates information buffer 13b to store the information therein in preparation for the next feature-coordinates information S5 to be found. The last picture feature-coordinates information buffer 13b retains a last feature-coordinates information S6 until the present feature-coordinates information S5 is inputted, and outputs the information, which has been retained, to the macro-block unit motion vector estimating circuit 3 as the last picture feature-coordinates information S6 when the present feature-coordinates information S5 is inputted.

The feature-coordinates buffer 13a outputs a global motion vector estimating signal S7 to the outside of the global motion vector estimating circuit 10. The last picture feature-coordinates information buffer 13b outputs the feature coordinates information to the outside of the global motion vector estimating circuit 10. To the macro block motion vector estimating circuit 10, a feature fixing request signal S9 is supplied, in addition to the current image information S1, the reference image information S2, the present feature presence information S4, the feature-coordinates information S5 and the last picture feature-coordinates information S6. From the macro block motion vector estimating circuit 3, a motion vector information S10, a motion vector extraction stopping signal S11 and a correction information S12 on a feature fixing are outputted.

When the feature-coordinates extracting circuit 12 finds a feature, it transfers the coordinates of the newly found feature and a feature find flag to the feature-coordinates information buffer 13a to store them. Contrarily, when no characteristic point has been found, the flag is erased as no characteristic point. Thereafter, an operation command is outputted to the macro-block unit motion vector estimating circuit 3. The macro block motion vector estimating circuit 3 refers to the feature-coordinates information buffer 13a. When no feature exists, the macro block motion vector estimating circuit 3 extracts a motion vector on each of the macro blocks in accordance with a usual operation procedure. When a feature exists, the macro block motion vector estimating circuit 3 refers to the last picture feature presence information of the last picture feature-coordinates information buffer 13b, and confirms whether a feature has existed in the last picture. When the feature has existed, the feature can be traced. Therefore, a global motion vector is calculated by deriving a difference between the feature coordinates of the last screen stored in the last picture feature-coordinates information buffer 13b and the feature coordinates of the input screen stored in the feature-coordinates information buffer 13a.

At this time, it is determined whether the feature-position fixing request signal S9 is active. If the feature-position fixing request is active, when data is read out of the current image frame memory 1, the coordinates of the readout picture element (pixel) are corrected in accordance with the global motion vector, and the motion vector information for each of the macro blocks is extracted to be outputted to S10. At this time, a correction information S12 on the characteristic-point fixing is outputted since it is required to cause the information on the correction of the coordinates carried out for the input image, to reflect the reference image when displaying a picture and inputting the next picture.

In a case where the global motion vector can be detected and the feature fixing request has not been carried out, the following operations are carried out.

(1) In a case where the global motion vector has deviated from the range defined by the moving picture compression system, the motion vector extraction for each of the macro blocks is stopped, and the motion vector extraction stopping signal S11 is outputted for each of the macro blocks.

(2) In a case where the global motion vector has been within the range defined by the moving picture compression system, the global motion vector and the motion vector close to the global motion vector are retrieved at the initial stage of the retrieval of the motion vector for each of the macro blocks, so that it is possible to increase the probability that a correct motion vector will be found at the initial stage and to decrease the costs in electric power and time. For each of the macro blocks of the current image frame memory 1, the motion vector is derived from the reference image frame memory 2, and the motion vector information S10 on each of the macro blocks is outputted. In this case, the motion vector information S10 has the accumulated results of the luminance difference (SAD) in accordance with the use thereof.

Figure 3:
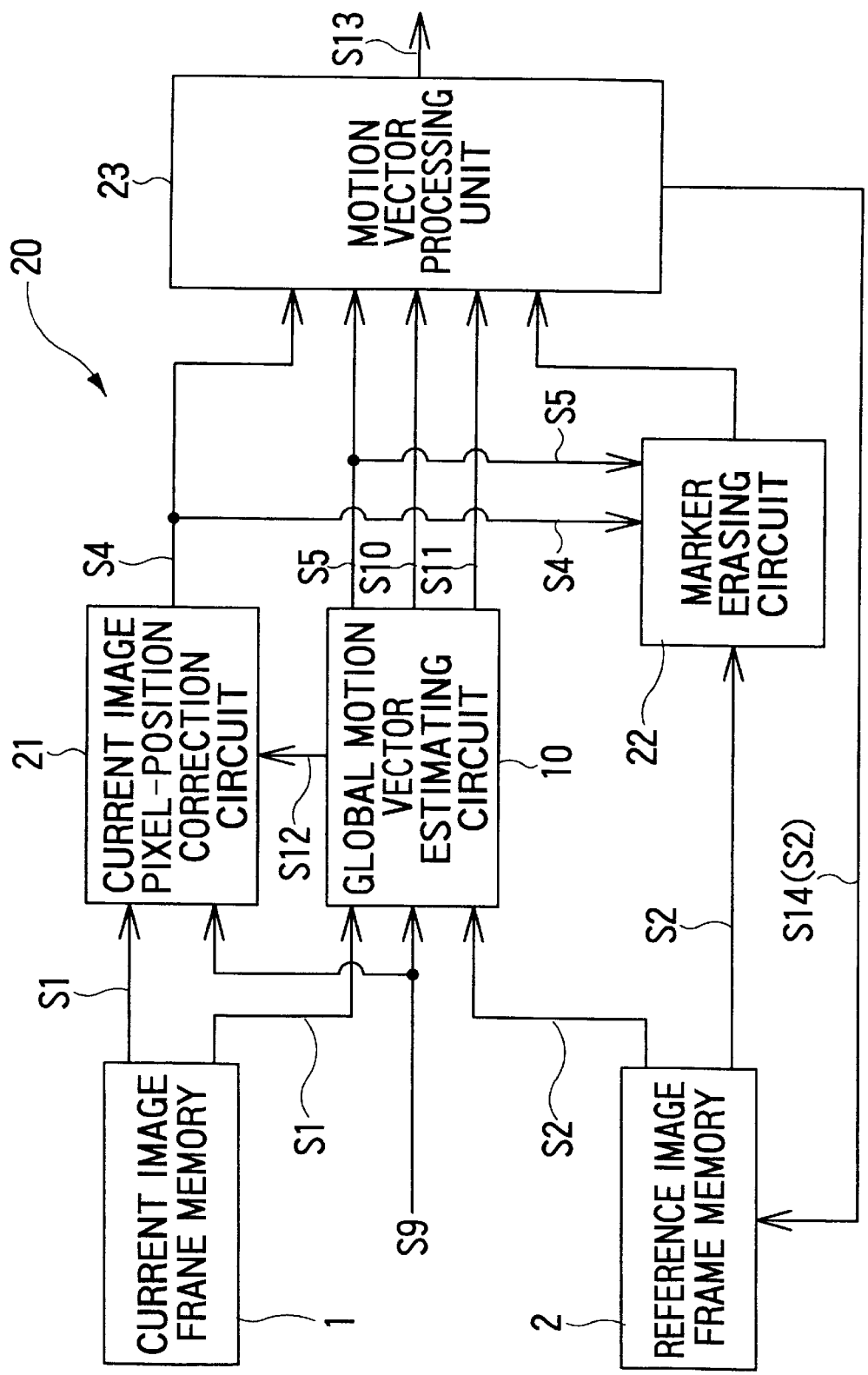
FIG. 3 is a block diagram of the third preferred embodiment of a motion vector estimating system according to the present invention.

Referring to FIG. 3, the third preferred embodiment of a motion vector estimating system, according to the present invention, will be described below.

FIG. 3 is a block diagram of a moving picture compression system 20 with the global motion vector estimating circuit 10 in the second preferred embodiment shown in FIG. 2.

In FIG. 3, the moving picture compression system 20 comprises a current image frame memory 1, a reference image frame memory 2, a global motion vector estimating circuit 10, a current image pixel-position correction circuit 21, a marker erasing circuit 22, and a motion vector processing unit 23 including a motion vector estimating system for processing image information in accordance with the use, such as the moving picture compression.

In this third preferred embodiment, the moving picture compression system 20 has the global motion vector estimating circuit 10 in the first and second preferred embodiments. In the first and second preferred embodiments, the motion vector estimating system has estimated a global motion vector by extracting a feature in image information, e.g., a feature of spectacles. On the other hand, the third preferred embodiment includes a new concept wherein, in view of the case that no intelligible feature exists in a principal object, a marker seal is put on the principal object when taking a moving picture, so that a characteristic point is physically added, and the added feature (marker) is erased when processing the picture.

If necessary, the marker erasing circuit 22 refers to a feature presence information S4 and a feature-coordinates information S5, or the last feature presence information S4 and the last feature-coordinates information S5, to erase feature designating markers on the image information, which has been stored in the current image frame memory 1 and the reference image frame memory 2, from the moving picture processing unit 23.

When a feature fixing request signal S9 is active, the current image pixel-position correction system 21 refers to a correction information S12 on the feature fixing to correct the coordinate of picture elements (pixels) when information is read out of the current image frame memory 1.

The moving picture processing unit 23 uses the feature presence information S4, the feature-coordinates information S5 and a motion vector information S10 for each of macro blocks to carry out the image processing using the information S1 of the current image frame memory 1 and the information S2 of the reference image frame memory 2, which are obtained through the marker erasing system 22, to output a result S13. When a motion vector extraction stopping signal S1 for each of the macro blocks is active, the processing in the case of no motion vector is carried out. In addition, a reference image information S13 (S2) necessary to input the next picture is transferred to the reference image frame memory 2.

Figure 4:
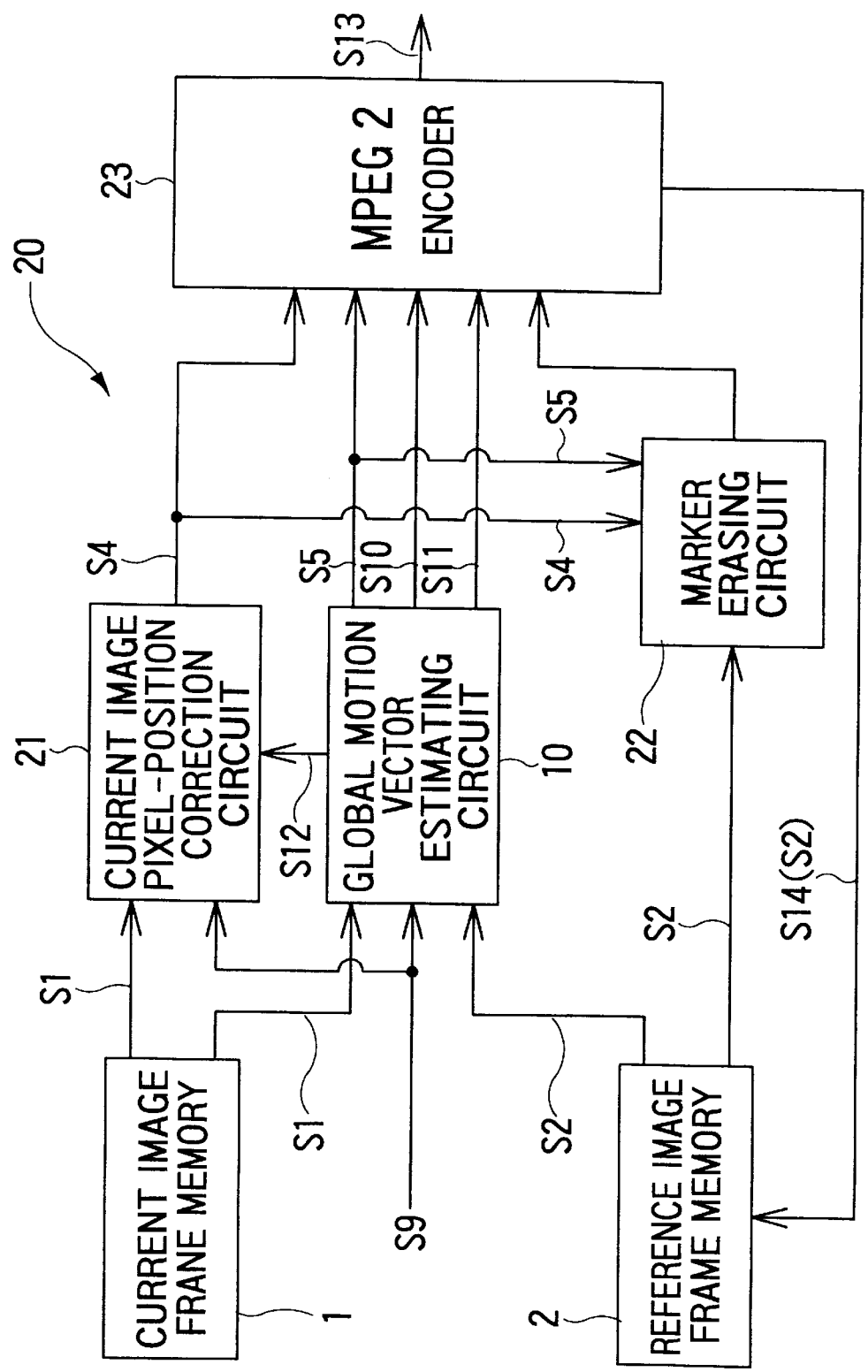
FIG. 4 is a block diagram of the fourth preferred embodiment of a motion vector estimating system according to the present invention.

Referring to FIG. 4, the fourth preferred embodiment of a motion vector estimating system, according to the present invention, will be described below.

In this preferred embodiment shown in FIG. 4, an MPEG2 encoder 25 for carrying out the production of a differential picture, the DCT transform and the coding of MPEG2 is substituted for the image processing unit 23 in the third preferred embodiment shown in FIG. 3, to form a moving picture compression system for MPEG2. Therefore, the elements of the same reference numbers as those in FIG. 3 have the same constructions and operations as those of the moving picture compression system in the third preferred embodiment, so that the duplicate descriptions are omitted.

Figure 5:
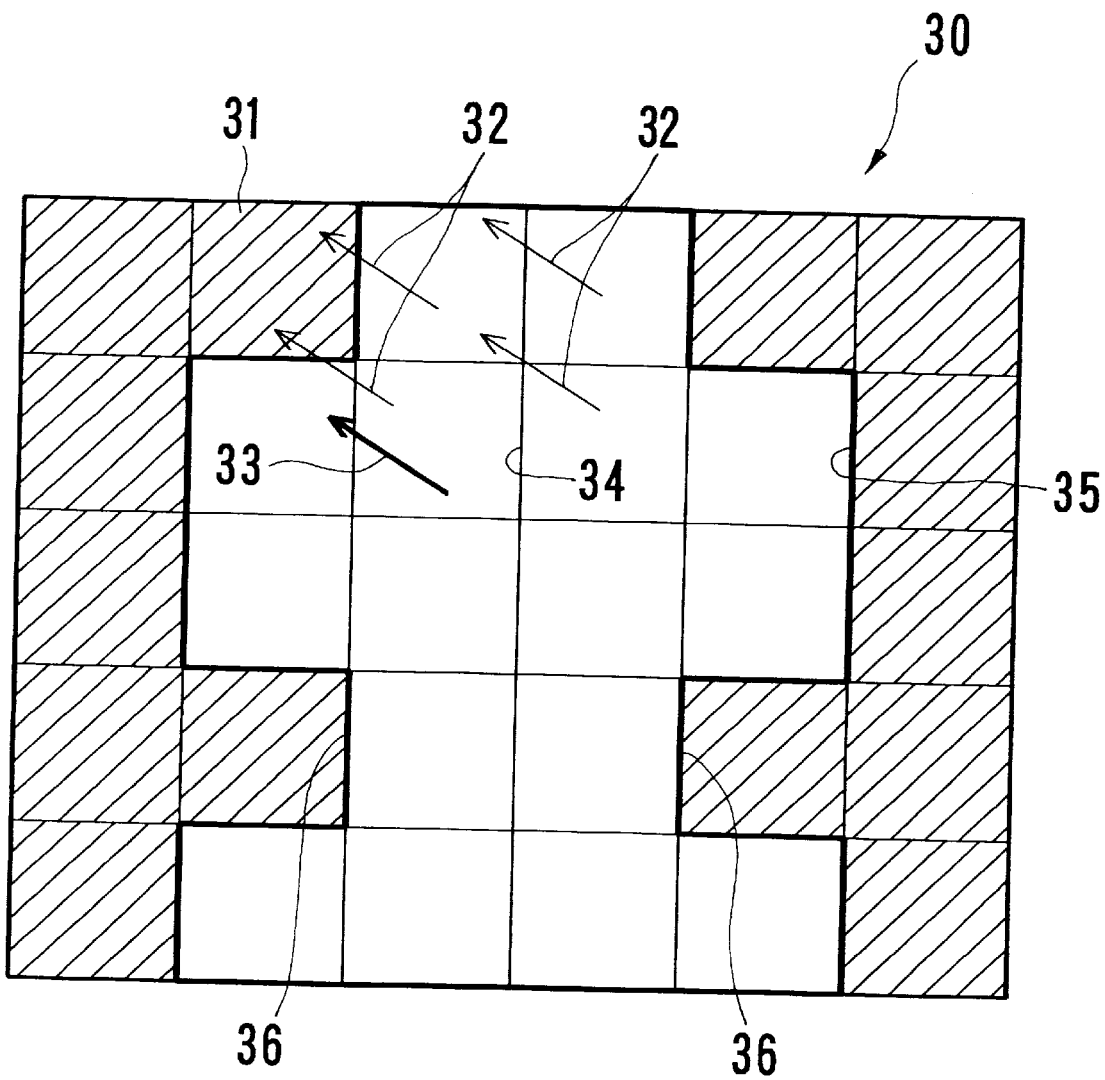
FIG. 5 is an explanatory drawing illustrating the operation of the fifth preferred embodiment of a motion vector estimating system according to the present invention.

Referring to FIG. 5, the fifth preferred embodiment of a motion vector estimating system, according to the present invention, will be described below.

In this fifth preferred embodiment, the operation of image processing blocks when cutting out a principal object using the motion vector estimating system in the third preferred embodiment will be described. The whole input image 30 is divided into macro blocks 31. It is assumed that motion vectors 32 have been calculated for the respective macro blocks 31, and a global motion vector 33 has also been calculated.

In this case, from a macro block 34 containing a specific point to a macro block 36 having a luminance difference signal (SAD) value, which is greater than or equal to a predetermined value, or a large difference between a motion vector and a global motion vector, the surrounding macro blocks are grouped. In this procedure, it is possible to easily group a group 35 of macro blocks, which contain a characteristic point and have a motion vector close to the global motion vector. In this case, it is possible to quickly find macro blocks defining a boundary and to greatly quicken the operation when the principal object is cut out of the moving picture.

Figure 6:
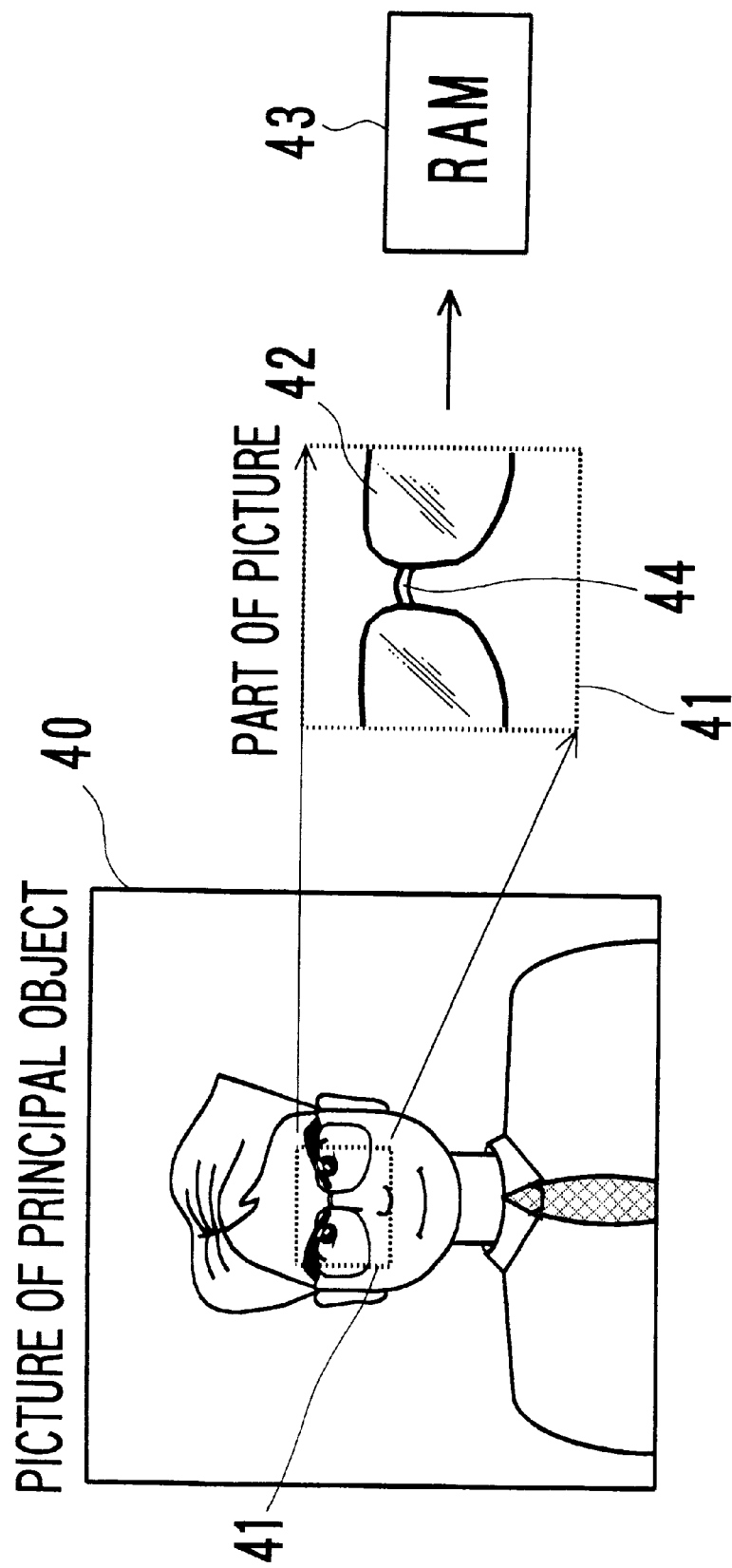
FIG. 6 is an explanatory drawing illustrating the operation of the sixth preferred embodiment of a motion vector estimating system according to the present invention.

Referring to FIG. 6, the sixth preferred embodiment of the present invention will be described below.

This sixth preferred embodiment is an example of the operation of the feature setting means or the feature describing circuit 11 in the first and second preferred embodiments shown in FIGS. 1 and 2. In FIG. 6, a part 41 of a picture 40 of a principal object is cut out, and a partial picture information 42 is recorded in a RAM 43 as a feature describing information to be referred as the feature describing information. An object having a low possibility of deformation is desired for the feature description. Therefore, in this preferred embodiment, the shape of a frame 44 of spectacles is selected from a picture of a face of a person to be partially recorded.

Figure 7:
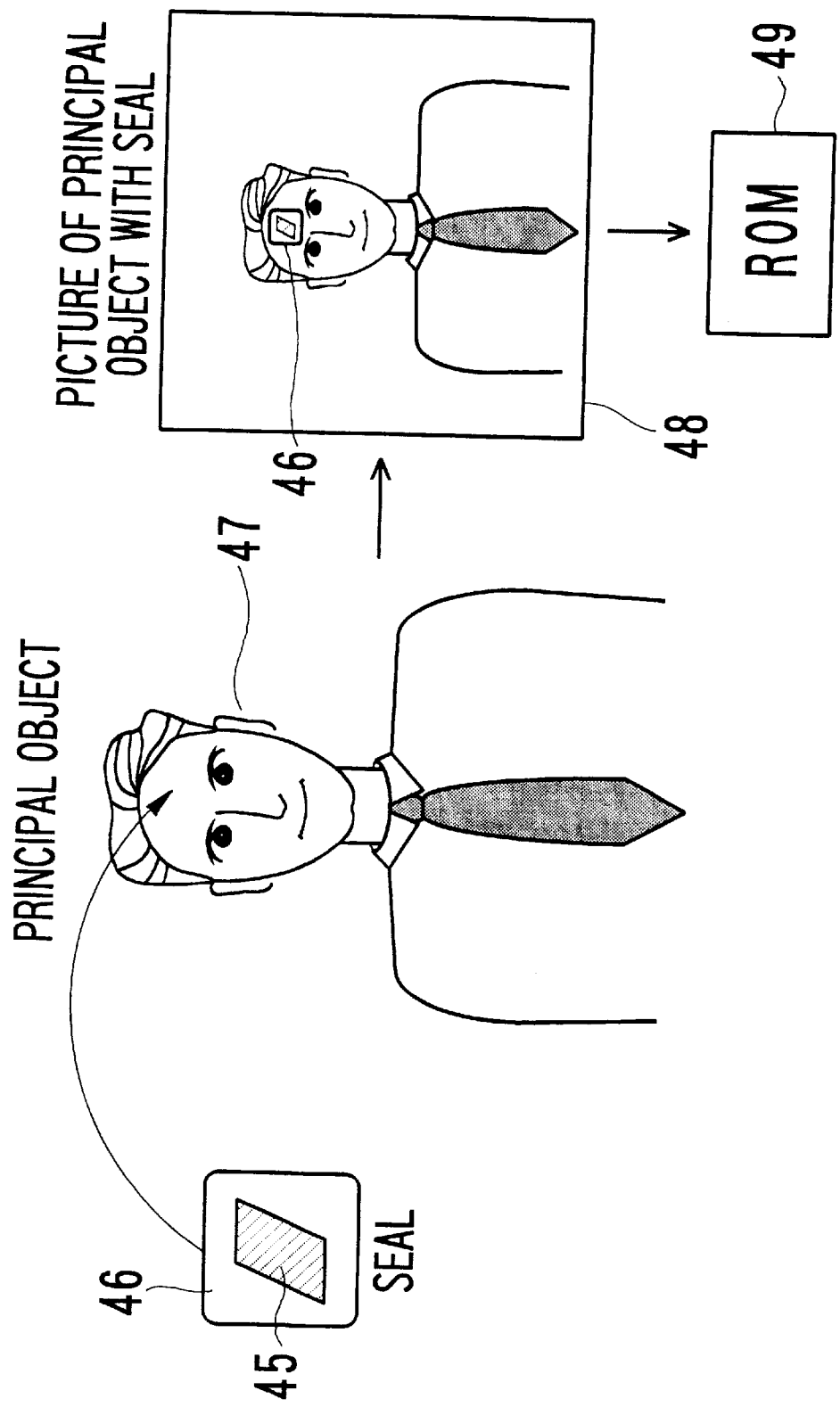
FIG. 7 is an explanatory drawing illustrating the operation of the seventh preferred embodiment of a motion vector estimating system according to the present invention.

Referring to FIG. 7, the seventh preferred embodiment of the present invention will be described below.

FIG. 7 is an explanatory drawing illustrating an example of feature setting means or a feature describing circuit in the first or second preferred embodiment shown in FIG. 1 or 2.

In FIG. 7, a seal 46 having a feature information 45 easy to be described is put on a principal object 47, and the feature of a picture 48 is detected by referring to a ROM 49, in which the feature information 45 is described. The characteristic-point detecting system, which comprises a set of the seal 46 indicating a specific point and the feature describing ROM 49, prepares a plurality of patterns of the seal 46. The user can use different patterns in accordance with the status, and the patterns can be easily used even if the background color and luminance are different. In addition, since the patterns are specific patterns, it is possible to easily realize both of the preparation of a plurality of patterns in the ROM 49 and the finding of a pattern out of the whole screen, in comparison with a programmable characteristic-point describing system.

Furthermore, even if an image pattern corresponding to an image pattern written in the ROM 49 is set in a stamp, an emblem, a pennant, a mark of a cap and accessories of spectacles, similar to the seal, which are associated with the characteristic-point describing system referring to the ROM to be used as a set, the same advantages can be obtained.

Figure 8:
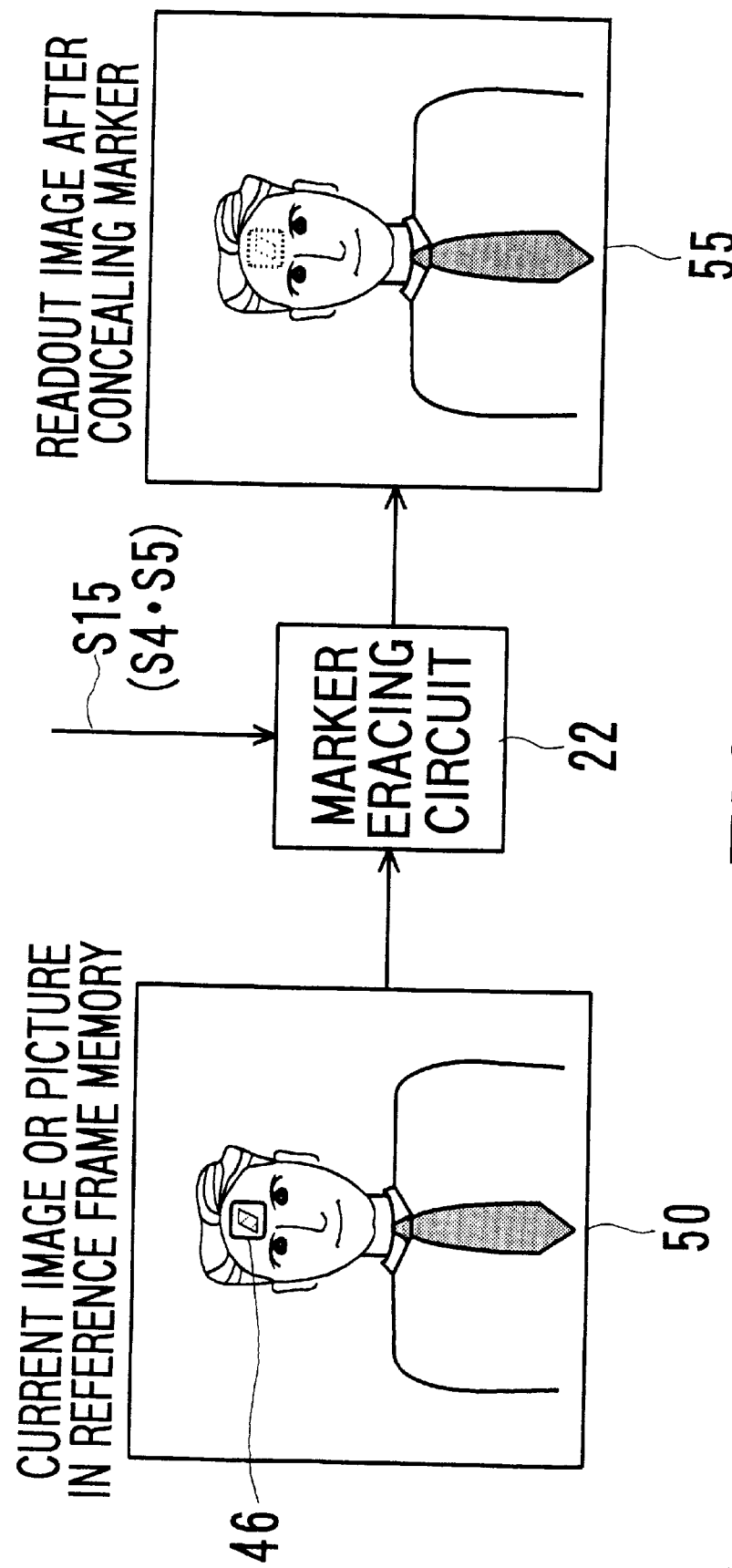
FIG. 8 is an explanatory drawing illustrating the operation of the eighth preferred embodiment of a motion vector estimating system according to the present invention.

Finally, referring to FIG. 8, the eighth preferred embodiment of the present invention will be described. The eighth preferred embodiment corresponds to a detailed example of the motion vector estimating systems in the third and fourth preferred embodiments shown in FIGS. 3 and 4. FIG. 8 shows a preferred embodiment of a marker erasing circuit 22 of FIG. 3. The marker erasing circuit 22 is provided for erasing a feeling of wrongness on a picture when a feature information seal 46 in the seventh preferred embodiment is put on a face of a person. The marker erasing circuit 22 receives a feature presence/coordinate information input S15 (S4 and S5), to replace the input by an average value of the values of picture elements (pixels) surrounding the marker 46 when a portion corresponding to the marker 46 in a current image (or a reference image) 50 is read out, so that the marker 46 does not appear in a readout image 55.

What is claimed is:

1. A motion vector estimating system comprising:

current image storing means for storing a current image being an inputted moving picture information;

reference image storing means for storing a reference image information;

a motion vector estimating circuit for estimating a motion in the current image stored in the current image storing means, in relation to the reference image stored in the reference image storing means; and a global motion vector estimating circuit including:

feature setting means for setting and storing a feature being a partial region distinguishable from other regions of a principle object in a picture, feature-coordinates extracting means for searching the current image stored in the current image storing means, for the feature stored in the feature setting means, to identify the position of the feature on a coordinate as feature coordinates, and feature-coordinates storing means for storing the feature coordinates extracted by the feature-coordinates extracting means, wherein said motion vector estimating circuit derives a difference between the feature coordinates stored in said feature-coordinates storing means and the feature coordinates extracted by said feature-coordinates extracting means on the basis of a feature presence information outputted from said feature-coordinates extracting means, to estimate a global motion vector, when said feature-coordinates extracting means extracts the coordinates of the feature, which has been set by said feature setting means, from said current image.

2. A motion vector estimating system as set forth in claim 1, wherein said global motion vector estimating circuit comprises:

a feature describing circuit, serving as said feature setting means, for describing said feature;

a feature-coordinates extracting circuit for extracting said feature from a screen of the current image supplied from a current image frame memory serving as said current image storing means, to output the presence and coordinates of said feature in the screen;

a feature-coordinates information buffer for temporarily storing the feature coordinates outputted from said feature-coordinates extracting circuit; and a last picture feature-coordinates information buffer for storing the feature of the last current image, which has been stored, when the feature coordinates of the present current image is outputted to said feature-coordinates storing buffer.

3. A motion vector estimating system as set forth in claim 2, wherein said feature describing circuit for describing a predetermined shape of marker serving as said feature on the picture of said principal object at an optional position is provided in said global motion vector estimating circuit, and which further comprises:

a current image pixel-position correction circuit for correcting the coordinates of a picture element when reading said current image information out of said current image frame memory on the basis of correction information on a feature-position fixing outputted from said global motion vector estimating circuit in a case where a feature-position fixing request signal supplied from the outside is active, to output a feature presence information representative of the presence of said feature in the current image; and a marker erasing circuit for erasing said marker described by said feature describing circuit from the picture on the basis of the coordinates information outputted from said global motion vector estimating circuit and the feature presence information outputted from said current image pixel-position correction circuit.

4. A motion vector estimating system as set forth in claim 2, wherein said motion vector estimating circuit is provided in a moving picture processing unit, which carries out the image processing of the current image supplied from said current image frame memory using a motion vector information of each macro block serving as a unit obtained by dividing said current image into partial regions, said feature presence information and said feature coordinates information, and which carries out the image processing in the case of no motion vector when a motion vector estimation stopping signal for stopping the estimation of a motion vector for each of macro blocks is active.

5. A motion vector estimating system as set forth in claim 4, wherein said moving picture processing unit is provided in a MPEG2 encoder for processing a moving picture in accordance with the standard of MPEG2, which is a standard defined by a moving picture expert group.

6. A motion vector estimating system as set forth in claim 1, which further comprises a feature describing circuit for describing a marker being a specific picture serving as a feature set on said principal object at an optional position, and feature-coordinates extracting means having storing means for storing the feature of said specific picture, and said motion vector estimating system extracting the feature of said principal object from the whole region of a picture frame or field to extract global coordinates of the feature of the principal object to measure the movement of the characteristic point of the principal object between frames or fields to derive said global motion vector of said principal object.

7. A motion vector estimating system as set forth in claim 1, which further comprises stopping means for stopping the estimating operation of a motion vector with respect to a macro block serving as each of partial regions of a divided screen when the magnitude of said global motion vector of said principal object is unsuitable for a moving picture compression standard.

8. A motion vector estimating system as set forth in claim 7, wherein a motion vector close to the global motion vector is preferentially calculated in said macro block serving as each of partial regions of the divided screen.

* * * * *